June 1, 1965     A. ELLENBOGEN     3,186,307
CONTROL VALVE SYSTEM FOR PRESSURE FLUID CYLINDER
Filed April 17, 1964     2 Sheets-Sheet 1
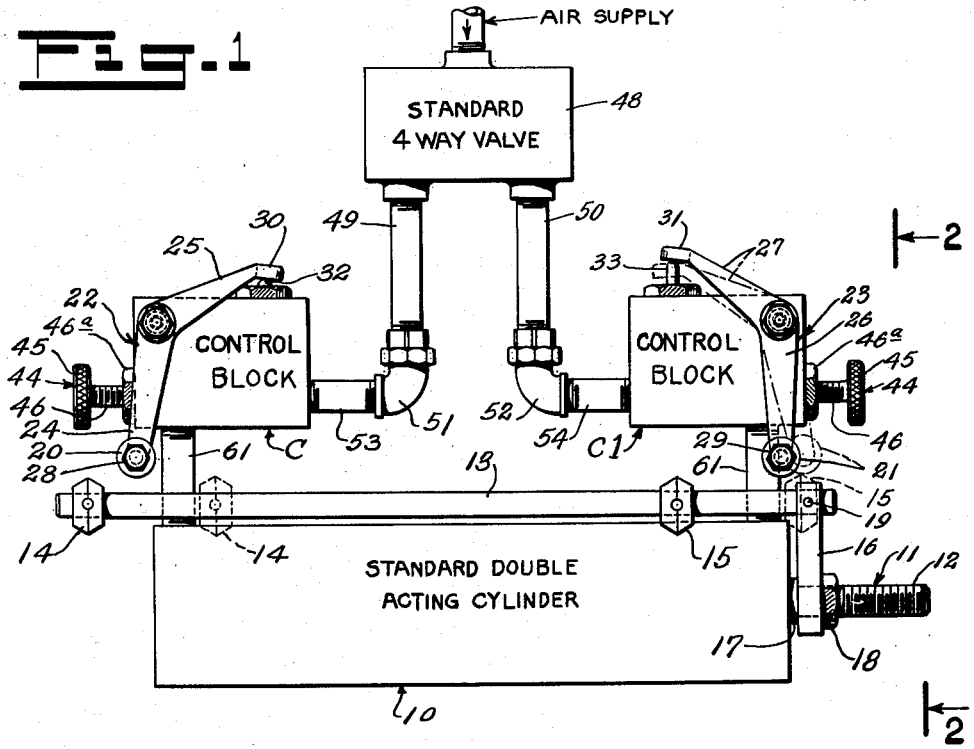
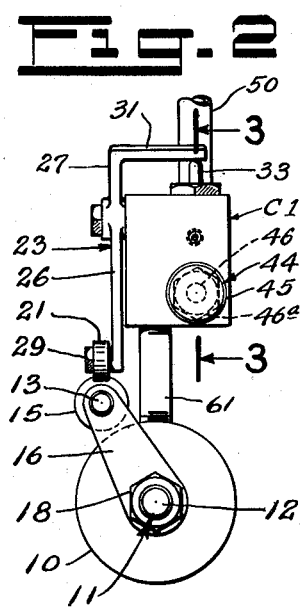
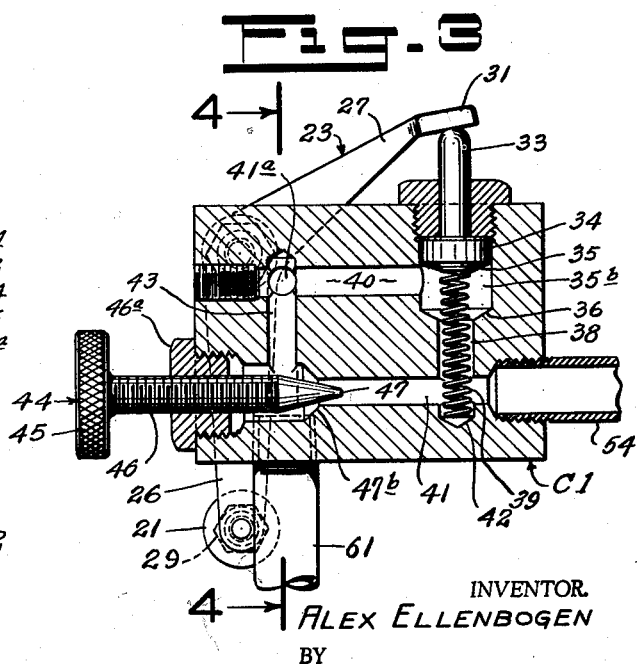
INVENTOR.
ALEX ELLENBOGEN
BY
H. G. Manning
ATTORNEY

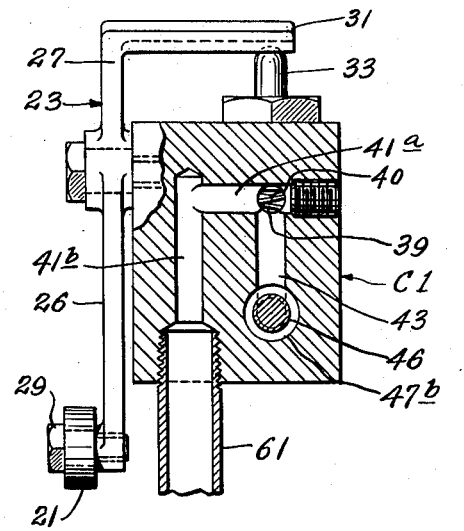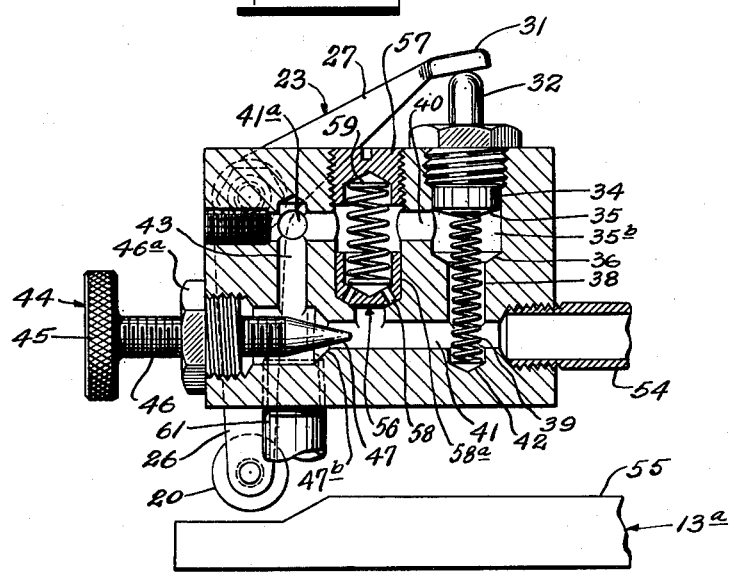

United States Patent Office 3,186,307
Patented June 1, 1965

3,186,307
CONTROL VALVE SYSTEM FOR PRESSURE FLUID CYLINDER
Alex Ellenbogen, 81 Hillside Ave., Torrington, Conn.
Filed Apr. 17, 1964, Ser. No. 363,051
2 Claims. (Cl. 91—31)

This application is a continuation-in-part of my copending application Serial No. 154,675 on Air Control Valve for Double Acting Cylinder, filed November 24, 1961, now abandoned.

This invention relates to control systems for pressure fluid cylinders, and deals more particularly with such a system adapted to cause the reciprocating piston rod of such a cylinder to move at two different speeds throughout two different portions of its stroke while moving in either one or both of its directions of reciprocating movement.

The general object of this invention is to provide a control system for a pressure fluid cylinder whereby the piston rod of the cylinder may be moved at a high speed during one portion of its stroke and at a slower speed during the other portion of its stroke.

Another object of this invention is to provide a control system of the foregoing character wherein the point along the stroke of the piston rod at which the change of speed occurs may be readily varied.

Another object of this invention is to provide a control system of the foregoing character wherein the speed of the piston rod, while traveling through the slower speed portion of its movement, may be readily adjusted.

A still further object of this invention is to provide a control system of the foregoing character which may be made from a minimum number of parts, which is inexpensive to manufacture, easy to install and manipulate, and very efficient and durable in use.

Other objects and advantages of the invention will be apparent from the following description and from the drawings forming a part hereof.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is an elevational view, somewhat schematic, showing a generally conventional pressure fluid cylinder combined with a control system embodying the present invention.

FIG. 2 is a fragmentary end view of the apparatus shown in FIG. 1, this view being taken on the line 2—2 of FIG. 1.

FIG. 3 is a vertical cross-sectional view, on an enlarged scale, taken on the line 3—3 of FIG. 2.

FIG. 4 is a vertical cross-sectional view taken on the line 4—4 of FIG. 3.

FIG. 5 is a vertical cross-sectional view, generally similar to FIG. 3, but showing a modified form of the control block and a modified form of cam for operating the valve element.

Turning now to the drawings in which like reference numerals denote corresponding parts throughout the several views, and first considering FIGS. 1 to 4, the reference numeral 10 indicates a standard double acting pressure fluid cylinder which includes a reciprocating piston (not shown) connected with a piston rod 11 which is moved in a reciprocating manner in use with the reciprocating movement of the piston. The control system of this invention has particular utility in connection with pneumatic systems and therefore the cylinder 10 is herein considered to be a pneumatic cylinder. It will be understood, however, that the system may, if desired, be used with hydraulic systems and that there is no intention to limit the invention to pneumatic systems, the pneumatic system of the drawings being intended to be exemplary only.

FIG. 1 shows in general the arrangement of the parts of a control system embodying the present invention and arranged to cause the piston rod 11 to move at two different speeds while traveling in both directions of its reciprocating movement. As shown in this figure the system includes two control blocks C and C1 each of which is used to control the movement of the piston rod while moving in one of its two directions of travel. Where it is desired to control the movement of the piston rod at two different speeds while traveling in only one of its directions of movement, one of the control blocks may be omitted. Referring to the system shown in FIG. 1, the piston rod 11 includes a threaded rod end 12 which has connected thereto a horizontal cam rod 13 by means of a vertical connecting link 16 and a pin 19. The cam rod 13 is thereby fixed in a position parallel to the piston rod 11 and is moved in unison with the rod. Received on the cam rod 13 are a pair of cams 14 and 15 which through set screws or other releasable fastening means are capable of being fixed to the cam rod at various different positions along its length. The cam 14 is adapted to control the operation of the left-hand control block C and the cam 15 is adapted to control the operation of the right-hand control block C1. As will be more evident hereinafter, each cam is so shaped as to cause only a momentary actuation of the associated control block as the piston rod of the cylinder moves through the length of its stroke, the cams in this instance having a generally double-conical shape as shown. The piston rod 11 is also provided with a shoulder 17 against which the connecting link 16 is held in a fixed position by means of a nut 18 received on the threaded portion 12 of the piston rod.

As explained hereinafter, each control block includes a control valve element which is movable between open and closed positions relative to its seat to control the flow of pressure fluid through the control block. Between the control valve element and the associated cam 14 or 15 is a cam follower mechanism for operating the valve element in response to the movement of the cam. Considering the right-hand control block C, this follower mechanism comprises a bell crank lever 22 which is pivotally connected with the body of the control block for movement about a horizontal axis, the bell crank lever including a lower arm 24 and an upper arm 25. On the lower end of the lower arm 24 is a roller 20 rotatably supported by a pin 28, the roller 20 being located in the path of the cam 14. As the cam 14 moves past the roller 20 the bell crank is momentarily rotated in one direction and immediately thereafter released. At the upper end of the arm 25 is a valve actuating finger 30. The cam follower mechanism for the right-hand control block C1 is similar to that for the left-hand control block C and comprises a bell crank lever 23 supported from the body of the control block for movement about a horizontal axis and including a lower arm 26 and an upper arm 25, the lower arm including a roller 21 rotatably supported by a pin 29 and the upper arm including a valve actuating finger 31. In FIG. 1 the bell crank lever 23 is shown in solid lines in its normal or unactuated position and is shown in broken lines in its actuated position.

Turning now to the construction of the control blocks, as shown in FIGS. 2, 3 and 4, each of these blocks is designed to provide a first pressure fluid flow path communicating with one side of the cylinder 10. In this flow path is an adjustable restriction for controlling the rate of flow therethrough and by-passing the restriction is a second flow path having cooperating therewith a control valve element which is movable between open and closed positions to permit and prevent the flow of pressure fluid therethrough. Referring to FIGS. 2, 3 and 4, the control block therein shown has connected therewith a horizontal pipe 54 and a vertical pipe 61. The first pressure fluid flow path mentioned above is defined by the pipe 61, the passageway 41b, the passageway 41a, the passageway 43, the passageway 41 and the pipe 54. The arrangement of these pipes and passageways in the control body will be evident from FIGS. 3 and 4. From FIG 3 it will also be noted that the passageway 43 is perpendicular to the passageway 41 and adjacent the intersection of these two passageways the passageway 41 is surrounded by a conical seat 47b which cooperates with the conical point 47 of a needle valve 44 to provide a restriction in the flow path. As shown, the needle valve 44 includes a knurled exterior handle 45 and a threaded shank portion 46 which is threadably received in a bushing 46a threaded into an opening in the control block body aligned with the passageway 41.

The second fluid flow path which by-passes the restriction provided by the needle valve 44 is defined by the passageways 40 and 38 shown in FIG. 3. These two passageways are at right angles to each other and at the intersection thereof the passageway 38 includes a valve chamber 35b which is of a substantially larger diameter than the passageway or port 38. At its lower end the valve chamber 35b includes a conical valve seat 36 which surrounds the passageway or port 38. Received in the valve chamber 35b is a control valve element 34 which is adapted to reciprocate in the chamber 35b between open and closed positions relative to the valve seat 36. On its lower end the valve element includes a conical surface 35 adapted to seat against the seat 36 when the valve element is moved downwardly from its open position shown in FIG. 3. The valve element includes a pin 33 which extends upwardly through a bushing threaded into the body of the control block so as to be engageable with the actuating finger 31 of the associated bell crank lever. The diameters of the pin 33, of the valve chamber 35b and of the passageway or port 38 are so related that when the valve element 34 is moved to its closed position, the effective area of the control valve exposed to the pressure existing in the valve chamber 35b is greater than the area of the valve element exposed to the pressure existing in the passageway 38 with the result that when the pressure in the valve chamber exceeds the pressure in the passageway 38 the control valve element 34 will be held in its closed position, after being moved to such position, by the difference in pressure thereacross so that the bell crank lever may be returned to its normal position without the control valve returning to its open position. The control valve element is preferably biased toward its open position by a spring 39 received in the passageway 38 and engageable with the bottom of the control valve, the lower end of the spring being received in a recess 42. The spring 39 is a relatively weak spring so as not to prevent the control valve from being held closed by the difference in pressure existing thereacross.

Having now described the contruction of the control system shown in FIGS. 1 to 4, its operation may be stated as follows. A mechanically controlled conventional four-way valve 48 operates automatically, as for example in response to movement of the part moved by the piston rod 11, to first supply pressurized air to the left-hand control block C through the pipes 49 and 53 and to thereafter supply air to the right-hand control block C1 to the pipes 50 and 54. When air is supplied to the left-hand control block through the pipes 49 and 53 it is simultaneously exhausted from the right-hand control block through the pipes 50 and 54, and when air is supplied to the right-hand control block through the pipes 50 and 54 it is simultaneously exhausted from the left-hand control block through the pipes 49 and 53. As shown in FIG. 1, the pipe 49 is joined to the pipe 53 by an elbow 51 and the pipe 50 is joined to the pipe 54 by an elbow 52. Each control block C and C1 operates to control the motion of the piston rod 11 when the air passing therethrough is air being exhausted from the cylinder 10.

Assume that the piston rod 11 is in the position shown by the solid lines in FIG. 1 and that the four-way valve is operated to supply air to the pipe 49 and to exhaust air from the pipe 50. Both of the control valves in the control blocks are in their open positions at this time and as a consequence the piston rod 11 will be moved by the piston of the cylinder to the right as its full normal speed until the right-hand "momentary" cam 15 strikes the roller 21 on the lower end of the right-hand bell crank lever 23. This engagement of the roller 21 with the cam 15 causes the bell crank to be rotated to the broken line position shown in FIG. 1 and in turn causes the actuating finger 31 to depress the valve pin 33 and move the valve element 34 to its closed position relative to the seat 36. When the valve element 34 reaches its closed position, the pressure in the passageway 40 and the valve chamber 35b is greater than the pressure in the passageways 41 and 38 due to the fact that the air is exhausting from the pipe 61 to the pipe 54. This difference in air pressure therefore holds the control valve 34 in its closed position. As soon as the momentary cam 15 moves beyond the roller 21 the pressure exerted by the actuating finger 31 on the valve pin 33 is released, but the control valve 34 instead of moving back to its open position remains in its closed position because of the differential pressure existing thereacross. Because the control valve 34 is in its closed position the air exhausting from the pipe 61 to the pipe 54 is now required to pass through the restriction provided by the needle valve point 47 and the seat 47b and as a result the speed of the piston rod 11 will be decreased for the remainder of the stroke thereof.

At the end of the stroke of the piston rod above described, the four-way valve 48 is operated to reverse the connections with the air supply so that pressurized air is now supplied to the pipe 50 and exhausted from the pipe 49. As soon as this occurs the pressure in the passageway 38 of the right-hand control block C1 is made greater than the pressure existing in the valve chamber 35b so that the control valve 34 is immediately moved to its open position to permit unrestricted flow of air to the right-hand side of the cylinder 10. At the same time the control valve of the left-hand control block C is also open so that the piston rod is moved to the left at its normal high speed. At a given point along the length of this stroke of the piston rod, however, the cam 14 will engage the roller 20 of the left-hand control block to rock the bell crank lever 22 to close the associated control valve element, this control valve element having its valve pin shown at 32 in FIG. 1. This operation of the control valve is similar to that described above in connection with the control block C1 and as a result the air exhausting from the left-hand side of the cylinder is caused to flow through the restriction in the control block C with the result that the speed of the piston rod 11 is reduced.

As mentioned previously above, it will be understood that while a pair of control blocks C and C1 are shown in the system of FIG. 1, it is within the spirit and scope of this invention to employ only one such block on either end of the cylinder, in which event the piston rod 11 moves at two different speeds while traveling in one direction of its reciprocating movement and moves at its normal high speed throughout the full length of its travel in the other direction of its movement.

A modified form of the invention is shown in FIG. 5. This figure shows a control block which is generally similar to the one shown in FIG. 3 except for it including a third passageway which is in parallel with the passageway including the control valve element and which also by-passes the restriction. The third passageway includes a check valve which permits air to by-pass the restriction when the control valve is in its closed position and when air is exhausted through the control block from the pipe 54 to the pipe 61. This use of the check valve permits the control valve 34 to be used with a cam which is shaped in such a manner that the actuating finger 31 of the bell crank continues to hold the control valve in its closed position after the control valve is moved to such position.

Referring to FIG. 5, the control block therein shown is generally similar to that shown in FIG. 3, and those features which are the same in both figures have been given the same reference numerals and need not be redescribed. The third passageway which by-passes the restriction formed by the needle valve is defined by a vertical passageway 58a which extends from the passageway 40 to the passageway 47. This passageway is formed to define a conical seat in its lower end and received therein is a check valve 56 which is generally cup-shaped in appearance. A number of openings 58, 58 are formed in the lower end of the cup to permit the passage of air therethrough when the check valve is moved upwardly from the closed position shown in FIG. 5. The valve is normally biased toward the illustrated closed position by a spring 59 which is received in the recess of the check valve as shown and which extends upwardly therefrom into a similar recess formed in a plug 57 threadably attached to the body of the control block.

In place of a momentary cam, such as the cams 14 and 15 of FIG. 1, the control block of FIG. 5 has associated therewith a cam 13a having a profile such as shown at 55 whereby the bell crank lever 23 after engagement of the roller 20 with the cam 13a is held in its rotated position, to hold the valve element 34 in its closed position, until the piston rod to which the cam is attached completes its stroke and until the piston rod and cam pass the same point on the return stroke at which the cam was engaged by the follower on the preceding stroke.

The operation of the device shown in FIG. 5 is therefore such that when air is supplied to the cylinder to cause the piston rod and the cam 13a to move to the left in FIG. 5, the cam and the piston rod will move at normal high speed until the roller 20 is engaged by the raised portion of the cam profile 55. When this occurs the control valve 34 is moved to its closed position by the actuating finger 31 of the bell crank lever. The air exhausting through the illustrated control block is therefore caused to pass through the restriction provided by the needle valve 44 with the result that the speed of the piston rod is reduced. The raised portion of the cam profile extends for the full length of the remaining portion of the stroke of the piston rod. At the end of this stroke the air supplied to the control block is reversed by the four-way valve with the result that pressurized air is now supplied to the pipe 54. At this time the control valve 34 is still held in its closed position by the actuating finger 31, but the check valve 56 is now operated by the pressure in the passageway 49 and the air supplied by the pipe 54 passes through the check valve to the cylinder 10 without restriction by the needle valve 44. When the roller 20 passes to the lower portion of the cam profile 55 on the return stroke of the piston rod, the actuating finger 31 is raised to permit the control valve to move to its open position to condition the control block for again controlling the speed of the piston rod movement during the next forward stroke of the piston rod.

The invention claimed is:

1. In a control system for controlling the operation of a pressure fluid cylinder having a reciprocating piston rod, the combination comprising means defining a first fluid flow path communicating with one side of said cylinder, means defining a restriction in said first flow path, means defining a second fluid flow path by-passing said restriction, means defining a valve chamber in said second flow path having a seat at one end thereof surrounding a port, a valve element in said valve chamber movable between open and closed positions relative to said seat, a cam moved in unison with said piston rod, a follower device engageable with said cam and with said valve element for operating said valve element in response to movement of said cam, said cam being so shaped as to cause said follower device to move said valve element to its closed position when said piston rod passes a given point in moving in one of its directions of reciprocating movement and to positively hold said valve element in said closed position until said piston rod passes said given point in moving in the other direction of its reciprocating movement, means defining a third fluid flow path in parallel with said second flow path and also by-passing said restriction, and a check valve in said third flow path arranged to permit flow therethrough when the pressure in said port exceeds the pressure in said valve chamber.

2. In a control system for controlling the operation of a pressure fluid cylinder having a reciprocating piston rod, the combination comprising means defining a first fluid flow path communicating with one side of said cylinder, means defining a restriction in said first flow path, means defining a second fluid flow path by-passing said restriction, means defining a valve chamber in said second flow path having a seat at one end thereof surrounding a port, a valve element in said valve chamber movable between open and closed positions relative to said seat, said valve element when in its closed position having an effective working area exposed to the pressure of the fluid in said valve chamber which is greater than the area of said port so that when the pressure of the fluid in said valve chamber is greater than the pressure of the fluid in said port said valve element will be held in its closed position by the difference in pressure after it is moved to its closed position, and means operable in unison with the movement of said piston rod for moving said valve element to its closed position when said piston rod reaches a given position along its stroke as it moves in one of its two directions of reciprocating movement, said means for moving said valve element to its closed position comprising cam means moved in unison with said piston rod, and a follower device engageable with said cam and with said valve element for operating said valve element in response to movement of said cam, said cam means including a cam element shaped to cause said follower device to move said valve element to its closed position when said piston rod passes a given point in moving in one of its directions of reciprocating movement and to positively hold said valve element in said closed position until said piston rod passes said given point in moving in the other direction of its reciprocating movement, means defining a third fluid flow path in parallel with said second flow path and also by-passing said restriction, and a check valve in said third flow path arranged to permit flow therethrough when the pressure in said port exceeds the pressure in said valve chamber.

References Cited by the Examiner

UNITED STATES PATENTS

| 1,812,533 | 6/31 | Hunt | 91—407 X |
| 2,902,050 | 9/59 | Carls | 91—24 X |
| 2,968,285 | 1/61 | Lowe | 91—31 X |
| 3,013,532 | 12/61 | Harper | 91—405 |

FRED E. ENGELTHALER, *Primary Examiner.*